DIAGNOSTIC SYSTEM
Filed Jan. 12, 1965
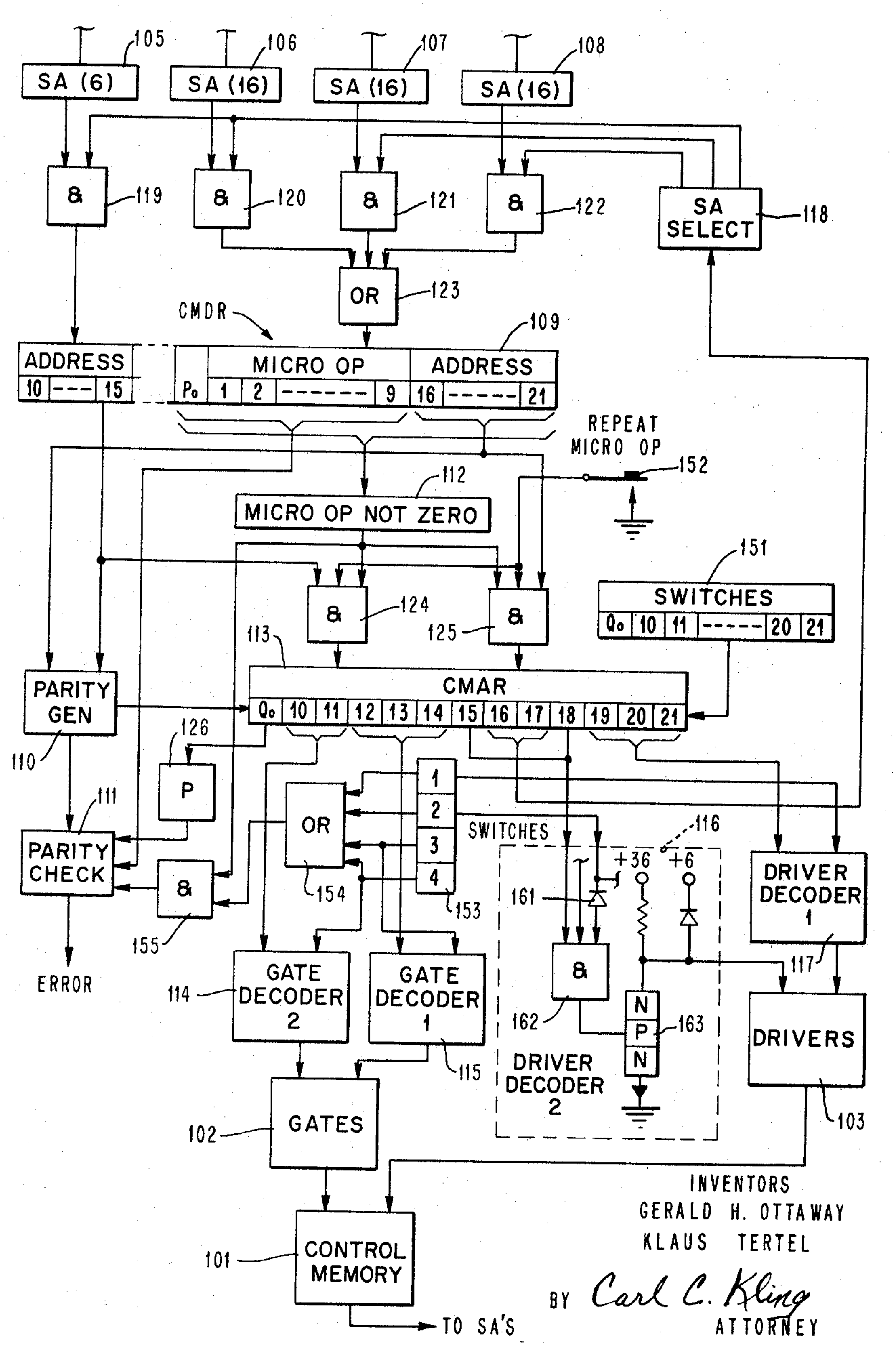
INVENTORS
GERALD H. OTTAWAY
KLAUS TERTEL
BY Carl C. Kling
ATTORNEY

United States Patent Office 3,387,262

Patented June 4, 1968

3,387,262

DIAGNOSTIC SYSTEM

Gerald H. Ottaway, Hyde Park, N.Y., and Klaus Tertel, Boblingen, Germany, assignors to International Business Machines Corporation, New York, N.Y., a corporation of New York Filed Jan. 12, 1965, Ser. No. 425,008
6 Claims. (Cl. 340—146.1)

ABSTRACT OF THE DISCLOSURE

Some memories for data processing apparatus have a network of switches that are turned on in a particular pattern according to an address to read the addressed word of the memory. A fault in the switch network can cause a spurious word to be read and superimposed on the addressed word. This invention provides means operable during a test to inhibit parts of the switch network such that only a spurious word can be read. Means is provided to detect such a word and to signal that a faut exists.

The invention is particularly useful with control memories of the type in which a word of the memory includes a micro operation and the address of the next word to be read. Means is provided to compare the parity of the address portion of one word with the parity of the next word read from the memory and to signal a fault in case of parity failure.

CHARACTERISTICS OF THE INVENTION

*Environment*

Data processing systems are capable of diagnostic routines to localize faults which cause errors in the system, if sufficient faultfree control structure is available to supervise the operation. Self diagnosis of the control structure itself, however, has not been generally possible. In computers operating under supervision of a control memory, which provide microinstructions, this self diagnosis has been particularly lacking in the area of the control memory. The control memory is normally a read only storage device which is addressed by a relatively standard memory addressing technique involving a selected driver and a selected gate to complete the selection circuit for a selected word readout. An address is decoded by driver and gate decoders to select the driver and gate. The control memory, when selected for readout, provides output signals which are used to control the data paths of the system.

A standard control memory system might include a control memory address register and four decoders. The decoders control the individual drivers and gates used to access a particular location in the control memory. A fault in the decoders could cause the wrong location in the control memory to be accessed which might cause an error to pass undetected.

*Objects*

An object of this invention is to locate faults in the decoders of a control memory.

Another object of this invention is to perform diagnostic procedures on a read only storage device.

A specific object of the invention is to localize faults causing double readout errors, which faults might be shorted components such as driver or gate transistors or diodes.

Another object is to maintain a parity check on addresses in a control memory system.

*Features and advantages*

A feature of the invention is a circuit which locates double readout faults in a memory by selectively inhibiting in a fixed sequence the gate and then the driver decoders for the selected word readout and recognizing any non-zero data as a spurious word. Another feature of the invention is a parity generator which checks an address on a first cycle and predicts parity for a second cycle, using the constraint that words stored at "even" locations (locations whose addresses have even parity) have odd parity and conversely.

The advantage of the invention is that it permits checking of the basic control of a data processing system and thus permits the data processing system to check itself.

The foregoing and other objects, features and advantages of the invention will be apparent from the following more particular description of a preferred embodiment of the invention as illustrated in the accompanying drawings.

*The drawing*

The drawing is a block diagram of the diagnostic system of the invention.

SUMMARY OF THE INVENTION

The invention is a diagnostic system for locating faults in a memory system, by selectively inhibiting in a fixed sequence the gates and then the driver decoders and recognizing any non-zero output as a fault-produced error.

Control memory 101 is accessed by gates 102 and drivers 103. Output of control memory 101 passes via sense amplifiers 105–108 to control memory data register (CMDR) 109. CMDR 109 is connected to parity generator 110, parity check circuit 111, "micro operation not zero" check circuit 112; the address portions of CMDR 109 are connected to control memory address register (CMAR) 113. CMAR 113 directly controls gate decoders 114 and 115 and driver decoders 116 and 117. The micro operation portion of CMDR 109, bits 1–9, is useful to supervise the data processing system (not shown) by controlling its data paths. The address portions, bits 10–15 and 16–21, pass respectively via AND circuits 124 and 125 to CMAR 113 to access the next micro operation. Bit Q0 of CMAR 113 is provided by parity generator 110 and passes to parity check circuit 111 via parity latch 126.

During diagnostic mode operation, switches 151 permit setting of CMAR 113 to particular address values and switch 152 permits repetition of the current micro operation for locating intermittent faults. For the detection of shorted transistor faults, switches 153 are connected respectively to driver decoder 117, driver decoder 116, gate decoder 115, gate decoder 114, in a fashion to inhibit the related decoder. With switches 153–1 and 153–2 operated, gate decoder 114 and gate decoder 115 are both inhibited. Any output from the control memory will provide an output from micro operation not zero box 112 via AND circuit 155 to provide via parity check circuit 111 the error signal.

*Diagnostic procedure*

The aim of the diagnostic procedure is to check out sufficient mechanism so that the checked mechanism can check the rest of the system. It is necessary to check out the control memory so that the control memory may be used to check the rest of the system.

Since the control memory is parity checked, the most likely fault which might occur undetected is a shorted driver or gate transistor. Such a fault, and similar faults in diodes and resistances which might cause an unselected driver or gate to appear selected, may be referred to as shorted faults. Such a shorted transistor might cause double readouts. That is, a spurious word would be read out along with the selected word, the bits of the two words being intermixed. It would be possible in some situations for this double readout to survive parity checks.

Another fault which might occur is an open driver or gate transistor circuit or decoder transistor circuit. Such a fault would result in a failure to read out the control memory, resulting in a mirco operation code (micro op) of all zeros. This would not survive the micro operation not zero requirement built into the micro operation code format.

Detection of open circuit faults is not difficult since, in many cases, the data processing system would simply cease to operate. Detection of the shorted component faults is not so easily accomplished with the ordinary diagnostic procedures unaccompanied by additional circuitry. Accordingly the test for shorted components is provided first, after which further tests, including the test for opens, are performed using standard available machine units.

The test of the control memory drivers and gates also tests the control memory sense amplifiers and parity circuits. After the test of the control memory is completed, it is then possible to use the control memory to supervise a diagnostic routine to test the remainder of the system.

*Control memory system*

The system includes control memory 101 which is accessed by gates 102 and drivers 103 to provide outputs to sense amplifiers 105–108. The output of control memory 101 is a micro operation code including bits 1 through 9 and an address in two sections, bits 10 through 15 and bits 16 through 21. This output passes to control memory data register CMDR 109 which is connected to parity generator 110, parity check circuit 111 and to micro operation not zero check circuit 112. The address portions of CMDR 109 connect to control memory address register (CMAR) 113 which directly controls gate decoders 114 and 115 and driver decoders 116 and 117. CMAR 113 also controls the sense amplifier gating via sense amplifier selected logic 118 and gates 119–123. The sense amplifier selection permits a 56-bit control memory to be addressed to provide a 22-bit output to CMDR 109. The micro operation portion of CMDR 109, bits 1–9, is useful to supervise the data processing system, not shown, by controlling its data paths. The address portions, bits 10–15 and 16–21, pass respectively via AND circuits 124 and 125 to CMAR 113 to provide the address for the next micro operation. Bit Q0 of CMAR 113 is provided by parity generator 110 and passes to parity check circuit 111 via parity latch 126. Parity generator 110 is necessary because the address portion of the CMDR content does not include a parity designation.

*Diagnostic system*

The mechanism discussed is used during ordinary operation cycles of the control memory. To check out the control memory, it is required to operate the control memory, in a diagnostic routine. Switches 151 permit setting of CMAR 113 to particular address values as required by the diagnostic routine. These values might be all zeros, for example. Repeat micro operation switch 152 permits repetition of the current micro operation, which is particularly useful in locating intermittent faults.

For the detection of shorted transistor faults, switches 153, OR block 154, and AND block 155 are included. Micro operation not zero circuit 112 is also involved. Switches 153 may be manual switches or may be switches under control of a ring or other similar sequencing device. The four outputs of switches 153 are connected respectively to driver decoder 1 (117), driver decoder 2 (116), gate decoder 1 (115) and gate decoder 2 (114) in a fashion to inhibit the related decoders. Any non-zero output from control memory 101 during inhibition of the selected decoders indicates a "shorted" fault.

Driver decoder 2 (116) only is shown in representative detail. Switch 153–2 connects via diode 161 to provide a ground potential inhibiting signal to AND block 162. AND block 162 also receives inputs from the address bits 15 and 18 of CMAR 113. With switch 153–2 operated, AND circuit 162 is inhibited from providing any output signal unless it itself is the fault and is shorted. If switch 153–2 is not operated, AND circuit 162 may be selected by the combination of 1 values in bits 15 and 18 of CMAR 113 and in turn condition transistor 163 to provide a conditioning input for the related driver. Similar circuits are included for other bit values.

OPERATION

*Test shorted-CMAR decoder or gate*

The following chart indicates the sequence of four major steps to locate a fault in the system.

| Step | Switch | Error | No Error |
|---|---|---|---|
| 1 | 153–3 and 153–4 | Gates 102 shorted | Gates 102 OK. |
| 2 | 153–4 | Gate Decoder 114 | Gate Decoder 114 OK. |
| 3 | 153–3 | Gate Decoder 115 | Gate Decoder 114 OK. |
| 4 | 153–1 and 153–2 | Drivers 103 shorted | Drivers 103 OK. |
| 5 | 153–2 | Driver Decoder 116 | Driver Decoder 116 OK. |
| 6 | 153–1 | Driver Decoder 117 | Driver Decoder 117 OK. |
| 7 | | Display CMAR | CMAR OK. |
| 8 | | Sense System and Checks | |
| 9 | | System Test | |

Switches 3 and 4 are operated for step 1*a*. They inhibit gate decoder 114 and gate decoder 115 so that gate 102 cannot be used in accessing the control memory. At the same time a normal operation cycle attempts to address control memory according to the address set in CMAR. Driver decoder 116 and driver decoder 117 are operative, selecting a driver out of the set of drivers in block 103. Since a driver and a gate is normally required to access control memory 101, there will be no output at this time unless a gate includes a shorted fault. The all zeros output of control memory 101 passes to the selected one of sense amplifiers and to sense amplifiers 119–123. CMDR 109 is tested for non zero by micro operation not zero circuit 112, which may be simply a multi-input OR circuit. If the micro operation is anything but zero, micro operation not zero circuit 112 provides an input to AND circuit 155 which, combined with an output from OR circuit 154 indicating that one or more of the switches is operated, signals parity check box 111 to provide an error signal.

An error signal at this stage indicates that a shorted fault is present in the gate 102. A shorted fault in one but not both gate decoders 114–115 would not activate gate 102 and thus would not produce a non zero output. If step 1 indicates no trouble in gate 102, step 2 is taken, with switch 153–4 set to block gate decoder 114. Switches 151 have been previously set to all zeros. Any non zero output signals parity check box 111 to identify the error as being located in gate decoder 114. A knowledge of the data content of control memory 101 permits the location of the fault to the exact gate circuit by comparing the outputs to the known content of each location in control memory 101. If no error occurs, the fault is not in gate decoder 114.

Step 3 is to block only gate decoder 115 by closing switch 153–3, and taking a cycle. An error at this time identifies the fault as in gate decoder 115.

If steps 1–3 in the diagnostic routine have been successfully completed, indicating that gates 102 and gate decoders 114 and 115 are without a shorted fault, step 4 is taken. Step 4 is the test for shorted drivers, taken by blocking driver decoders 116 and 117. Switches 153–1 and 153–2 are operated to inhibit the driver decoders and thus prevent any one of drivers 103 from addressing control memory 101. If, however, a driver transistor is shorted, control memory 101 will be accessed and a non-zero value read out via the sense amplifiers to CMDR 109. This non zero micro operation is detected by micro operation not zero circuit 112 via AND circuit 155 as conditioned by OR circuit 154 to provide an error signal from parity check 111.

If the diagnostic routine has completed steps 1–4 indicating that there are no shorted faults in the gate system 102, 114, 115 or drivers 105, steps 5 and 6 may be taken. These are similar to steps 2 and 3 for the gate decoders. Switches 153–1 and 153–2 are involved as shown in the chart. Switches 151 remain set to all zeros.

If steps 1–6 have been completed without detection of a fault, step 7 is tried. If a fault is still suspected to be present in the driver gate system, it is advisable to change the setting of switches 151 and pass through steps 1–6 again.

Step 7 is a test of CMAR 113. Since CMAR 113 normally is provided with a console display capability, switches 151 can provide a simple test of CMAR operation. Switches 151 are set in step 7 to various address values to read out the content of control memory 101 over a short period of cycles to compare the read out with the acceptable values. The CMAR display provides a check of the address bits 10–21.

If step 7 has been successfully completed, the data processing system can be operated under control of the control memory. If control memory 101 during this operational test should produce an all zeros output, such all zeros output is detected as a parity error in the normal checking of CMDR 109 by parity check circuit 111 which signals the error. The fault causing the error may be an open fault in a gate decoder, driver decoder, gate, driver, diode or memory component.

After this series of tests has been run, the control memory is accepted as being completely operative and is useful to control a diagnostic routine for the remainder of the system.

*Parity system*

It is advantageous to maintain a check of proper operation of control memory 101 by the expedient of controlling parity of the entire word according to the number of bits in the address of that word. Words stored at even locations have odd parity and words stored at odd locations have even parity. This constraint is no problem in a control memory of the read only type in which data values set in the control memory can be carefuly controlled. Parity check circuit 111 is arranged to compare the actual parity of the address portion of the current control memory data register setting with the parity predicted from the address in control memory from which the control memory data register data content came. If the address was even parity, the content of the address location should be odd parity. Parity check 111 accepts an interim parity bit from the parity generator 110 and the micro-op portions P0, 1, 2 . . . 9 of CMDR 109 and the output of parity storage trigger 126 to provide a parity of all these items and an error signal where the parity of the content of CMDR 109 is not the parity predicted from the address.

For example, suppose that word 6 is to be derived from control memory 101. Six is an even address since it contains an even number of 1 bits when expressed as binary 0110. The constraints for parity are indicated by the following equation:

$$\text{parity of address} - \text{parity of data contained in address location} = 1$$

Since the address of location 6 is an even parity address, the content of location 6 must be odd parity data. The even nature of address 6 results in a 0 bit stored in parity storage trigger 126 on the cycle where the location 6 is addressed by CMAR 113. On the next cycle, location 6 reads out to CMDR 109 and if there has been no error contains odd parity of all bits. The entire content of CMDR 109 is applied to parity check 111 along with the content of parity storage trigger 126. Parity check 111 indicates an error if the constraints for parity are not retained. Parity generator 110 serves as a part of parity checker 111 and also serves to provide the parity designation for CMAR 113.

*Switches*

Switches 151 and 143 may be manual switches of the simplest type. For automatic operation, electronic switches are used. These electronic switches are controlled by a programming device such as a ring. An automatic rotary stepping switch is also acceptable.

CONCLUDING SUMMARY

The invention is a diagnostic system for checking out and locating faults in a control memory system.

The technique used is to inhibit the selected readout in such fashion that a non zero readout can be caused only by a shorted fault, and test for such non zero output.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A fault locating system for a memory which has a network of switches which in response to an address signal conduct in a pattern to provide a selected output from the memory and in case of a fault in said network might also provide a spurious output which merges indistinguishably into the selected output wherein the improvement comprises, (a) means to inhibit selected parts of said network whereby the spurious output, if present, remains unmerged with the selected output; and (b) non zero test means to recognize a spurious output.

2. A diagnostic system having (a) a control memory, (b) a set of gates and a set of drivers for accessing said control memory upon coincident conditioning of a single gate and a single driver;

(c) gate decoder means for selecting a single gate;

(d) driver decoder means for selecting a single driver;

(e) control memory address register means for controlling said gate decoder means and said driver decoder means;

(f) read out means connected to said control memory for accepting the output of said control memory; and (g) parity means connected to said read out means for monitoring parity of said read out means for correctness, wherein the improvement comprises, (h) switch means connected to said gate decoder means and to said driver decoder means and operable selectively to inhibit operation of said gate decoder means and said driver decoder means in such fashion that during control by said switches a gate driver set is available only in the case of a shorted fault, whereby a non zero output of said control memory is indicative of such fault; and (i) means to detect as an error the readout of a non zero value from said control memory during the operated condition of said switches.

3. A fault locating system for a data transmission network having an output normally selected by combinations of conditions, and having first means and second means in electrical series circuit to access the network in response to a combination of conditions comprising, (a) means to inhibit selectively said first means to access the network and said second means to access the network; and (b) means connected to said inhibit means and to the output of the data transmission network to identify the presence of a fault by a network output occurring during operation of said means to inhibit.

4. Checking mechanism for a memory system having a parity checker, an address register containing the address of a word being read from the memory during one operation, and a data register containing the word read from the memory during said one operation and having a micro operation portion and a portion storing a next address to be read from the memory, each of said registers having a parity designation, wherein the improvement comprises, (a) parity generating means;

(b) means connecting said address portion of said data register to said parity generating means, whereby said parity generating means produces as an output a parity designation for said address portion of said data register;

(c) means connecting said address portion of said data register to said address register to provide the address of the next word to be read;

(d) means connecting the output of said parity generating means to said address register, whereby a parity designation of said next address is provided to said address register;

(e) storage means connected to said address register to store said next address parity designation for said next operation; and (f) means connecting said parity generating means, the micro instruction portion of said data register and the parity designation portion of said parity storage means to said parity checker to check the parity of said next addressed word and the address portion of the preceding word.

5. Checking mechanism according to claim 4, comprising (g) means connected to said data register and responsive to the non zero condition of said data register to provide an output;

(h) means for controlling diagnostic operation, including a set of switches, (i) means connecting said means (g) responsive to the non zero condition of said data register to said parity checker during operation of said means (h) for controlling diagnostic operation.

6. Checking mechanism according to claim 4, in which words stored at locations whose addresses have even parity have odd parity, and words stored at locations whose addresses have odd parity have even parity.

References Cited

UNITED STATES PATENTS

| | | | |
|---|---|---|---|
| 3,047,843 | 7/1962 | Katz et al. | 340—174 |
| 3,311,890 | 3/1967 | Waaben | 340—172.5 |

OTHER REFERENCES

Pugmire, J. M.: Parity Checked Digital Calculator, IBM Technical Disclosure Bulletin, vol. 6, No. 10, March 1964.

MALCOLM A. MORRISON, *Primary Examiner.*

C. E. ATKINSON, *Assistant Examiner.*